(12) United States Patent
Wetzel et al.

(10) Patent No.: US 12,412,482 B2
(45) Date of Patent: Sep. 9, 2025

(54) SIGNAL INTELLIGENCE PAYLOAD FOR UNMANNED AERIAL VEHICLE

(71) Applicant: Performance Drone Works LLC, Huntsville, AL (US)

(72) Inventors: Adam Daigler Wetzel, Huntsville, AL (US); Dylan Thomas Hamm, Boise, ID (US)

(73) Assignee: Performance Drone Works LLC, Huntsville, AL (US)

( * ) Notice: Subject to any disclaimer, the term of this patent is extended or adjusted under 35 U.S.C. 154(b) by 279 days.

(21) Appl. No.: 18/334,599

(22) Filed: Jun. 14, 2023

(65) Prior Publication Data

US 2024/0412650 A1 Dec. 12, 2024

Related U.S. Application Data

(60) Provisional application No. 63/506,585, filed on Jun. 6, 2023.

(51) Int. Cl.
*G08G 5/55* (2025.01)
*G08G 5/26* (2025.01)
*G08G 5/57* (2025.01)
*H04L 69/08* (2022.01)
*H04W 4/44* (2018.01)

(52) U.S. Cl.
CPC .............. *G08G 5/55* (2025.01); *G08G 5/26* (2025.01); *G08G 5/57* (2025.01); *H04L 69/08* (2013.01); *H04W 4/44* (2018.02)

(58) Field of Classification Search
None
See application file for complete search history.

(56) References Cited

U.S. PATENT DOCUMENTS

| | | | |
|---|---|---|---|
| 2017/0277176 A1* | 9/2017 | Hutson | G06F 3/011 |
| 2018/0351826 A1* | 12/2018 | Ahlport | G06F 3/04842 |
| 2022/0189320 A1* | 6/2022 | Melodia | G08G 5/26 |
| 2024/0151816 A1* | 5/2024 | Jagannath | G01S 7/417 |
| 2025/0080972 A1* | 3/2025 | Young | H04W 8/22 |

OTHER PUBLICATIONS

Chuck Gates, "Tactical SIGINT Payload TSP, The next generation of airborne signals intelligence (SIGINT) fielded by the U.S. Army", 2018 (BAE Systems) (Year: 2018).*

(Continued)

*Primary Examiner* — Christian Chace
*Assistant Examiner* — Shayne M. Gilbertson
(74) *Attorney, Agent, or Firm* — Pearl Cohen Zedek Baratz LLP

(57) ABSTRACT

An Unmanned Aerial Vehicle (UAV) payload includes an adaptive Software Defined Radio (SDR) interface that is configurable to communicate with two or more SDRs using two or more protocols, a UAV interface that is configured to communicate with the UAV and a control circuit connected to the adaptive SDR interface and to the UAV interface. The control circuit is configured to communicate with the adaptive SDR interface and with the UAV interface. The control circuit is configured to receive SDR data from the adaptive SDR interface, receive UAV flight data from the UAV interface and use the SDR data and the UAV flight data to generate Signal Intelligence (SIGINT) data regarding the one or more emitter.

20 Claims, 17 Drawing Sheets

(56) References Cited

OTHER PUBLICATIONS

Scholl, Stefan, "RF Signal Classification with Synthetic Training Data and its Real-World Performance," arXiv:2206.12967, [https://doi.org/10.48550/arXiv.2206.12967], Jun. 2022, 7 pages.

Hewlett Packard, "Wireless Signal Identification and Analysis—Enabling AI and Analytics at the Edge," Technical White Paper, DeepSig, Nov. 2020, 12 pages.

Edge, Dr. Alasdair, "Principles of Geolocation Techniques—A CRFS White Paper," CRFS Limited, Jul. 2019, 26 pages.

\* cited by examiner

| Field Name | Description | Data Source |
|---|---|---|
| Time Stamp | Time stamp of when data contained in message was recorded (Data collection between flight controller and Radio Software needs to be time synced) | Flight Controller and Radio Software |
| UAV Longitude | GPS Longitude of UAV when data was recorded | Flight Controller |
| UAV Latitude | GPS Latitude of UAV when data was recorded | Flight Controller |
| UAV Heading | Heading of UAV when data was recorded | Flight Controller |
| UAV Altitude | Altitude of UAV when data was recorded | Flight Controller |
| Emitter Frequency | Frequency of detected Radio Emitter | Radio Software |
| Emitter RSSI | RSSI of the Radio Emitter | Radio Software |
| Emitter LOB | Direction of Emitter relative to C100 (if available) | Radio Software |

Figure 7B

SIGNAL INTELLIGENCE PAYLOAD FOR UNMANNED AERIAL VEHICLE

CROSS-REFERENCE TO RELATED APPLICATIONS

The present application claims the benefit of U.S. Provisional Patent Application No. 63/506,585, filed on Jun. 6, 2023, which is hereby incorporated by reference in its entirety.

BACKGROUND

Radio controlled unmanned aerial vehicles or UAVs (e.g. drones, such as quadcopters) can move at high speed and make rapid changes in direction when remotely piloted by a user. A drone may include a flight controller that provides output to motors and thus controls propeller speed to change thrust (e.g. in response to commands received from a user via a communication channel such as a Radio Frequency (RF) communication channel established between a user's remote-control and a drone). For example, a quadcopter has four motors, each coupled to a corresponding propeller above the motor, with propellers mounted to generate thrust substantially in parallel (e.g. their axes of rotation may be substantially parallel). The flight controller may change the speeds of the motors to change the orientation and velocity of the drone and the propellers may remain in a fixed orientation with respect to the chassis of the quadcopter (i.e. without changing the angle of thrust with respect to the quadcopter) and may have fixed-pitch (i.e. propeller pitch may not be adjustable like a helicopter propeller so that each motor powers a corresponding fixed-pitch propeller in a fixed orientation with respect to a drone chassis). In some cases, a UAV may carry a payload.

SUMMARY OF THE DRAWINGS

FIG. 7B shows an example of a payload message.

DETAILED DESCRIPTION

The following presents systems and methods associated with UAVs or drones and payloads that may be carried by such UAVs or drones. In an example, a UAV payload may be a Signals Intelligence (SIGINT) payload (e.g., a payload that is used to collect and analyze Radio Frequency (RF) Signals to provide intelligence on the RF environment).

An example of a SIGINT payload includes one or more Software Defined Radio (SDR) and an antenna array that is used to receive signals from one or more emitters. A SIGINT payload may include components to enable different SDRs to be used (e.g., at different times and/or for different purposes) with little or no reconfiguration. For example, an adjustable voltage regulator in a SIGINT payload may be configurable to provide electrical power at a range of different voltages according to SDR specifications and an adaptive SDR interface in the SIGINT payload may be configurable to communicate using various different SDR protocols.

A SIGINT payload may be in communication with the UAV to which it is attached so that SIGINT payload can receive flight data (e.g., UAV position, heading, altitude, velocity, orientation) and direct the UAV according to SDR data (e.g., SDR data obtained by one or more SDR) in combination with flight data. For example, a control circuit in a SIGINT payload may direct the UAV to one or more locations or along a selected flightpath to facilitate emitter localization (e.g., to triangulate the location of an emitter) and/or to facilitate gathering of SIGINT (e.g., flying close to an emitter to obtain a clearer signal or better signal to noise ratio). Such control by the SIGINT payload may enable autonomous operation of a SIGINT UAV, which may be advantageous in an RF contested environment or an RF denied environment.

Aspects of the present technology may be implemented using a wide range of UAVs including, but not limited to drones (e.g. quadcopter drones). Such drones may be controlled by a user using a remote control device and/or may be controlled with little or no human input (e.g. using control circuits to fly a predetermined flightpath and/or for autonomous flight).

Although the following description is primarily given in the context of drones (e.g. quadcopters) moving along a three-dimensional flightpath, certain concepts presented can be applied more generally. For example, the systems and techniques can be applied to non-drone aircraft and/or ground-based vehicles, watercraft and the like.

Figure 1:
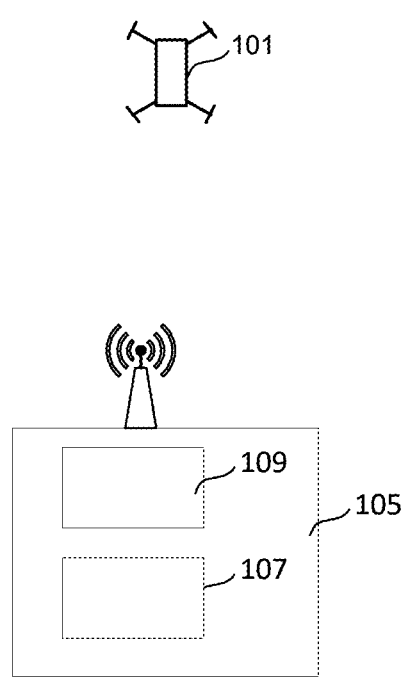
FIG. 1 is an example of a UAV and remote control.

FIG. 1 shows an example of a UAV 101, which is controlled by remote control 105 in this example. Remote control 105 includes a user input interface 107 (e.g. one or more joysticks, buttons, touchpads, touchscreens, keyboards, or other input device(s) configured to receive a user's input). User input interface 107 allows a user to provide appropriate input to control UAV 101 (e.g. by using joysticks to control direction and speed of UAV). Remote control 105 also includes a user output interface 109 (e.g. one or more visual displays, lights, indicators, speakers, or other output devices configured to provide output to a user). For example, a display may show one or more views from camera(s) located on UAV 101 (e.g. a camera providing a pilot's view from UAV 101 to allow FPV operation of UAV 101). In some examples, a UAV may be configured for autonomous operation so that some or all piloting is performed autonomously (e.g. without input from a remote control such as remote control 105). For example, UAV 101 may include a Global Positioning System (GPS) module to determine position or enable independent navigation and/or one or more cameras (e.g. cameras that are paired to form stereoscopic cameras) that may allow UAV 101 to locate features in its environment for navigation.

Figure 2:
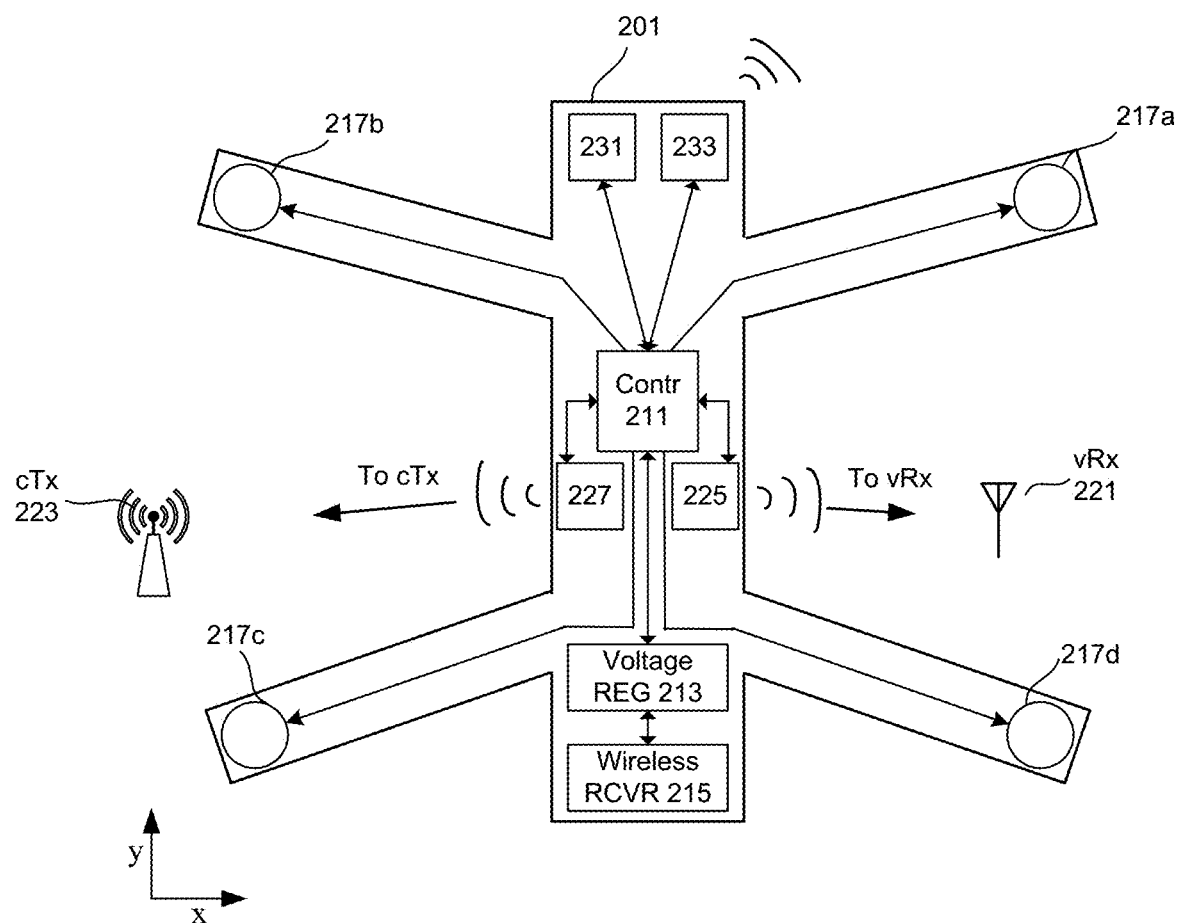
FIG. 2 is a simplified representation of some of the components for one embodiment of a UAV (quadcopter).

FIG. 2 is simplified representation of some of the components for one example of a UAV 201 (e.g., UAV 101), which is a remote-controlled quadcopter in this example. FIG. 2 shows flight controller 211 connected to motors 217*a-d* (which turn respective propellers, not shown in this view), the voltage source and regulator 213, wireless receiver 215, video camera 231 and altitude sensor 233, and the transmitters 225 and 227. In this embodiment, extending on an arm from each of the corners of UAV 201 is a motor 217*a-d*, each of which is controlled by the flight controller 211 to thereby control thrust generated by propellers attached to motors 217*a-d*. A voltage source (e.g. battery) and regulator 213 supplies power. A pilot's commands are transmitted from control signal transceivers such as cTx 223, received by wireless receiver 215. Control signal transceiver cTx 223 may be in a remote-control operated by a pilot (remote-control user) to fly UAV 201. The flight controller 211 uses power from the voltage source and regulator 213 to drive the motors 217*a-d* according to the pilot's signals.

UAV 201 also includes video camera 231 and altitude sensor 233 that supply data to the flight controller 211. An FM or other type video transmitter 225 transmits data from the video camera 231 to a video monitor receiver vRx 221 (external to the drone, such as on the ground) that monitors the video signals and passes on the video data to the pilot. Data can also be sent back to the control signal transceiver cTx 223 by the transmitter 227. Although the transmitter 227 and wireless receiver 215 are shown as separate elements in FIG. 2, in many embodiments these will be part of a single transceiver module. And control signal transceiver cTx 223 and video monitor receiver vRx 221 may be part of a single transceiver module. For example, a remote-control, such as remote control 105, may include both a control signal transceiver and a video monitor receiver to allow a remote-control user to see video from video camera 231 while piloting UAV 201.

Figure 3:
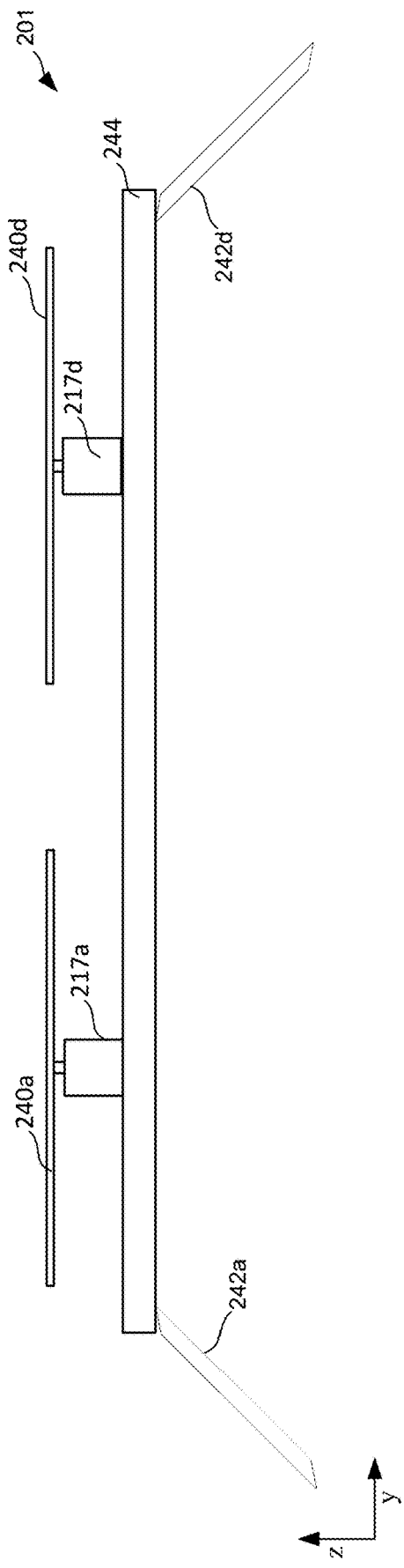
FIG. 3 shows an example of some components of a quadcopter.

FIG. 3 shows a simplified side-view of UAV 201, which includes motors 217*a*, 217*d* (two of four motors 217*a-d* are visible in this view) and attached propellers 240*a*, 240*d*. Also shown are legs 242*a* and 242*d* (two of four legs are visible in this view) that are attached to the bottom surface of chassis 244 and support chassis 244 when on the ground. Electric motors 217*a-d* are mounted to the top surface of chassis 244 and drive corresponding propellers.

In some cases, a UAV such as a drone may be used to transport a payload. A payload may be attached to the UAV in various ways (e.g., bolts, screws, pins, quick-release attachments, clips, mechanical release device, and/or other components). A payload may be passive (e.g., some item to be moved to a different location) or active (e.g., may include electronic components that are active while in-flight).

Figure 4:
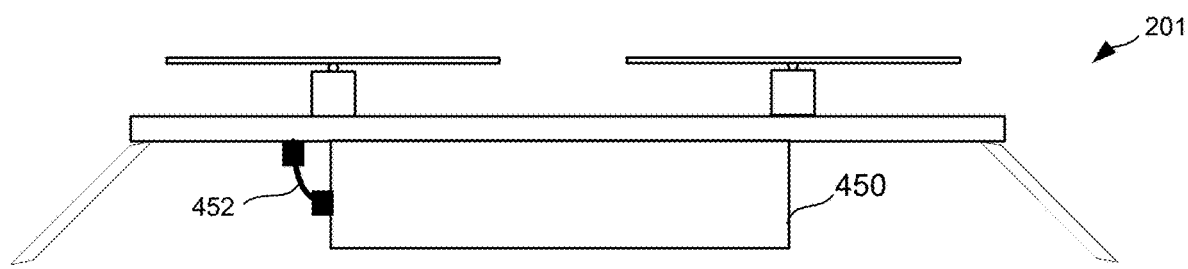
FIG. 4 shows an example of a quadcopter with a payload.

FIG. 4 shows an example of a payload 450 that is attached to UAV 201 so that it may be carried by UAV 201. In this example, payload 450 is an active payload that is electrically connected to UAV 201 by a cable 452 so that it can receive power from UAV 201 (e.g., from voltage source and regulator 213) and can communicate with UAV 201 (e.g., with flight controller 211). Payload 450 may also communicate with a Ground Command System (GCS) through UAV 201 (e.g., through transmitters 225 and 227, wireless receiver 215, or otherwise). In other examples, an active payload may include transmitter and/or receiver circuits so that it can communicate with a GCS independently of the UAV to which it is attached. In some examples, an active payload may include a battery, solar panel, or other energy source and may not require power from a UAV. In some cases, where communication and power are provided in a payload, an electrical connection to the UAV (e.g., cable 452) may not be provided.

Figure 5:
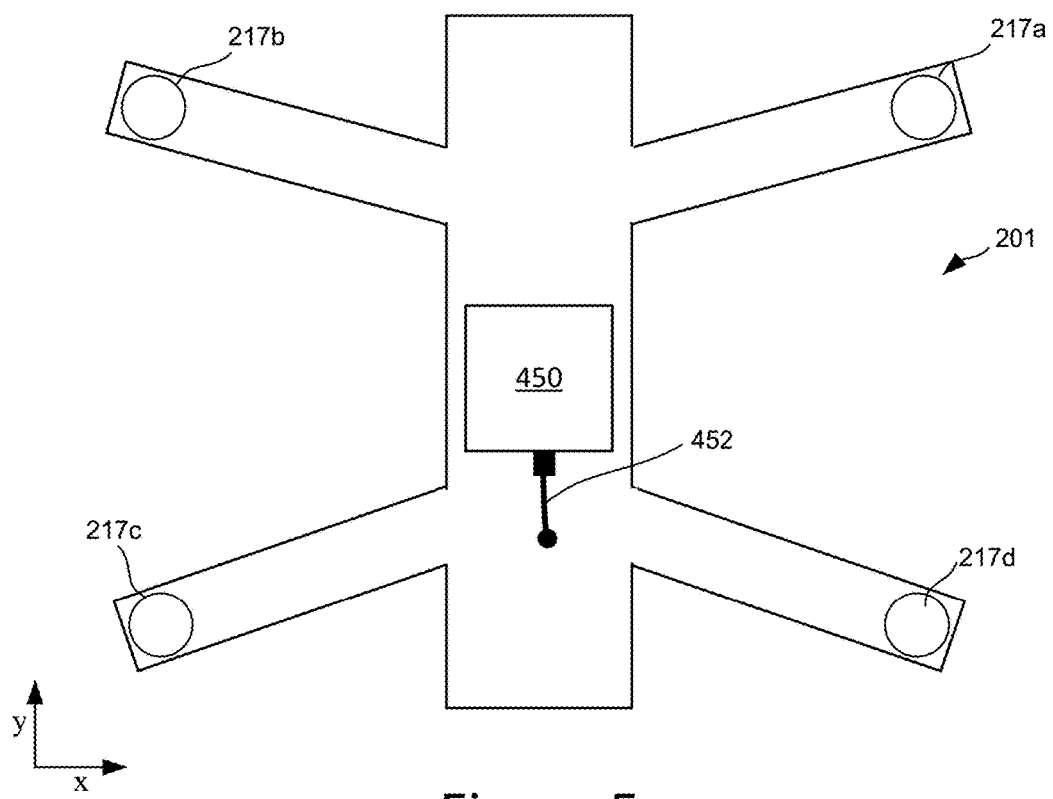
FIG. 5 shows an example of a quadcopter with a payload.

FIG. 5 shows a view of UAV 201 (e.g., view from below along the z-direction) with payload 450 attached to its underside. In addition to being mechanically attached to UAV 201 by attachment features (not shown in this view), payload 450 is electrically connected to UAV 201 by cable 452.

In some examples, a UAV payload (e.g., payload 450) may include one or more radio circuits that are designed to receive signals from one or more emitters in order to gather SIGINT. SIGINT platforms are used to collect and analyze Radio Frequency (RF) Signals to provide intelligence on the RF environment. A SIGINT payload (e.g., payload 450 of UAV 201) may include custom hardware and software that allows a user to gather Signals Intelligence and display results through the same Graphical Interface used to control a UAV (e.g., user output interface 109). In some examples, a payload (e.g., SIGINT payload 450) may also send flight commands to the UAV (e.g., to flight controller 211 of UAV 201) which allows the payload to control the flightpath of the UAV to carry out autonomous missions (e.g., without commands from a remote control), for example, in RF Denied locations (e.g., missions in areas where RF signals are jammed, obscured by geography, weather or noise, and/or where use of RF signals would create danger of detection and attack).

Integrating a SIGINT platform as a payload of a UAV allows an operator to collect RF information over a large area (compared with a stationary SIGINT platform) while reducing human exposure. Integration may be especially useful in Emitter Localization which requires data to be collected from multiple geographic locations.

Signals Intelligence (SIGINT) may include intelligence derived from electronic signals and systems such as Communications Systems, Radars, and Weapons Systems. SIGINT provides information on adversaries' capabilities, actions, and intentions. SIGINT may include Communications Intelligence (COMINT), such as Voice Interception (i.e. phone calls, radio communications) and Text Interception (i.e. emails, SMS, morse code). SIGINT may also include Electronic Intelligence (ELINT) such as Information on the RF signal and device emitting the signal and/or RF Signals used for purposes other than communication (e.g., RF Link between UAV and Operator). For example, an unknown RF signal may be received and may be classified according to modulation type (e.g., FSK, PSK, AM or other) and according to signal type (e.g., WiFi, Bluetooth, AM broadcast, Stang 4285, morse code or other). SIGINT may further include Emitter Localization, e.g., finding the specific location an RF signal is coming from (location of an emitter).

Emitter localization may use one or more techniques to determine the location of an emitter, including angle of arrival, time difference of arrival (e.g., time difference between arrival of a signal at two points of an antenna array that are separated by a distance), frequency difference of arrival (e.g., differential Doppler–measuring Doppler shift due to relative motion of receiver) and/or power of arrival (e.g., measuring different power of signal received at different locations). For example, angle of arrival techniques may determine the angle of arrival of an RF signal to obtain a Line Of Bearing (LOB) from the SIGINT platform to the emitter. Two LOBs from two different locations may be used to determine the emitter location (e.g., intersection of two LOBs gives emitter location). While two SIGINT platforms at two different locations may be used, a UAV SIGINT payload may be rapidly moved from one location to another to obtain two or more LOBs from a single SIGINT platform in a short time. In some cases, the movement of the UAV and SIGINT payload may be controlled so that LOBs provide high location accuracy (e.g., LOBs intersect at angles close to 90 degrees, greater than 60 or 30 degrees for example). In other examples, a UAV SIGINT payload may be used with another SIGINT platform at a different location (e.g., stationary, vehicle mounted, or mounted on another UAV) to obtain two or more LOBs at the same time.

Figure 6:
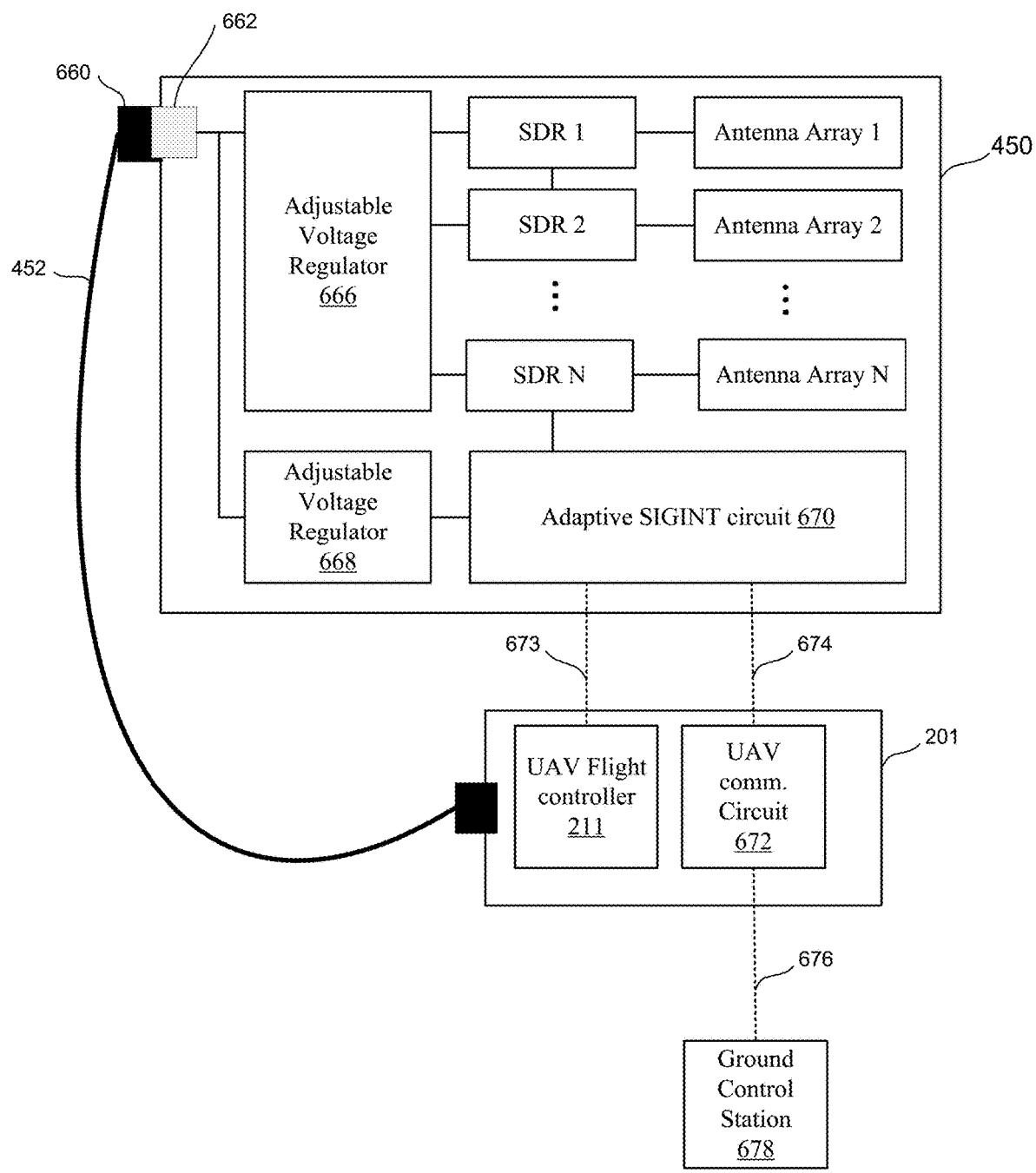
FIG. 6 shows an example of a SIGINT payload.

FIG. 6 shows a block diagram of certain components of payload 450, which in this example is configured as a SIGINT payload that is attached to UAV 201 (e.g., as shown in FIGS. 4-5). Cable 452 is shown connecting UAV 201 and SIGINT payload 450. Cable 452 provides power from UAV 201 (e.g., from voltage source and regulator 213) to SIGINT payload 450. Cable 452 includes connector 660, which connects with corresponding connector 662 of SIGINT payload 450 and allows rapid connection/disconnection.

Adjustable voltage regulator 666 receives power via cable 452 at a UAV supply voltage and produces one or more output voltages at desired voltage levels to one or more Software Defined Radios (SDRs), which are shown as SDR 1 to SDR N. Different SDRs may be produced by different providers and may have different power requirements, voltage requirements, communication protocols, form factors and may serve different functions (e.g. Voice Interception, Text Interception, obtaining information on the RF signal and device emitting the signal and/or RF Signals used for purposes other than communication, Emitter Localization, or other function). Each SDR is shown connected to a corresponding antenna array (e.g., SDR 1 is connected to Antenna Array 1, SDR 2 is connected to Antenna Array 2, and so on). In other examples, an SDR may be connected to more than one antenna array and/or two or more SDRs may share an antenna array. Antenna arrays may be configured for a given function (e.g., a directional antenna array for emitter localization, an omnidirectional antenna for voice interception, specific dimensions/configurations for specific frequencies). Antennas may be removable and may be swapped according to requirements. The SDRs and antenna arrays may be considered as an analog front end of payload 450 (outputs of SDRs may be digital communication). Adjustable voltage regulator 666 may provide power to SDR 1 to SDR N at appropriate supply voltages (e.g., different voltages for different SDRs). While adjustable voltage regulator 666 may be configurable to provide outputs at various different voltages at the same time (e.g., to SDR 1 to N in parallel), not all SDRs may be mounted at the same time in some examples. For example, a first SDR that requires a first supply voltage may be mounted at a first time and adjustable voltage regulator 666 may provide the first supply voltage. Subsequently, a second SDR that requires a second supply voltage may be mounted and adjustable voltage regulator 666 may provide the second supply voltage.

Adjustable voltage regulator 668 receives power via cable 452 at the UAV supply voltage and provides power to Adaptive SIGINT circuit 670. Adaptive SIGINT circuit is connected to one or more SDRs (e.g., any one or more of SDR 1-SDR N that is mounted at any given time). Adaptive SIGINT circuit 670 may be configured receive communication from different SDRs according to different SDR protocols. Adaptive SIGINT circuit 670 is also in communication with UAV 201, including communication channel 673 between Adaptive SIGINT circuit 670 and UAV flight controller 211 and communication channel 674 between Adaptive SIGINT circuit 670 and UAV communication circuit 672 (e.g., transmitters 225 and 227, wireless receiver 215). Communication channels 673 and 674 may be implemented through cable 452 or otherwise. Adaptive SIGINT circuit 670 may handle communication between UAV 201 and SIGINT payload 450 including SDRs, may configure and receive RF data from SDRs, and may combine SDR and UAV information to send to Ground Control Station. In an example, Adaptive SIGINT circuit 670 is implemented by an NVIDIA Jetson Xavier NX or similar Single Board Computer.

UAV 201 is in communication with Ground Control Station (GCS) 678 via wireless communication channel 676. GCS 678 may include circuits related to control of UAV 201 (e.g., may include remote control 105) and related to SIGINT payload 450. In other examples, these circuits may be separate (e.g., a remote control to control UAV 201 may be at a first location while circuits for communication and/or control of SIGINT payload 450 may be at another location. SIGINT payload 450 communicates with GCS 678 via UAV communication circuit 672 in this example. In other examples, SIGINT payload 450 may include a communication circuit and may communicate directly with GCS 678.

Figure 7A:
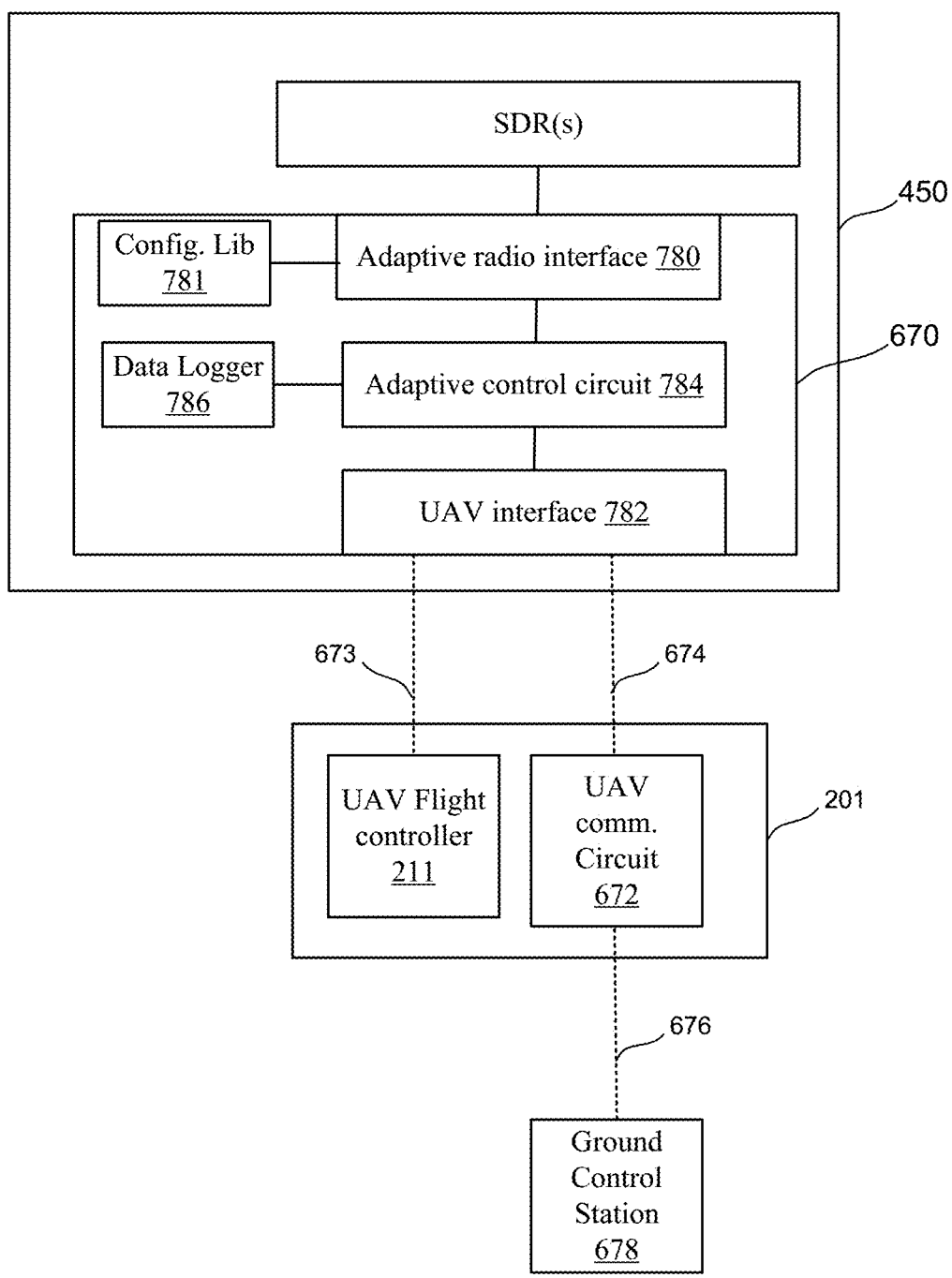
FIG. 7A shows an example of an adaptive SIGINT circuit in a SIGINT payload.

FIG. 7A shows an example of Adaptive SIGINT circuit 670 of SIGINT payload 450. Adaptive SIGINT circuit 670 includes an adaptive radio interface 780 (adaptive SDR interface or "radio front end") that is configurable to communicate with two or more SDRs using two or more protocols (e.g., SDRs configured to receive signals from one or more emitter). Adaptive radio interface 780 is connected to a configuration library 781 that includes a set of parameters for each SDR that is enabled (e.g., N sets of parameters for SDR 1 to N).

Adaptive SIGINT circuit 670 includes a UAV interface 782 which is in communication with UAV flight controller 211 via communication channel 673 and with UAV communication circuit 672 via communication channel 674 (also in communication with GCS 678 through UAV communication circuit 672 and wireless communication channel 676). Adaptive control circuit 784 is connected to adaptive SDR interface 780 to receive SDR data and is connected to UAV interface 782 to receive vehicle data from UAV 201 (e.g., GPS location, heading, altitude and/or other UAV location/position data). In some examples, some or all vehicle data may be generated by appropriate circuits in SIGINT payload 450 or directly attached to SIGINT payload 450. For example, a GPS receiver, Magnetometer, altitude sensor or other such sensor may be provided to generate vehicle data (e.g., GPS location, heading, altitude) without communication with the UAV to provide greater independence from the UAV. When all flight data is generated by appropriate sensors in SIGINT payload 450 or directly attached to SIGINT payload 450, communication with the UAV may not be necessary. When power is also provided in SIGINT payload 450 (e.g., using a separate power source such as a battery, no connection to the UAV may be necessary and may not be provided (e.g., cable 452 may not be provided). This may enable SIGINT payload 450 to operate in a "Standalone Mode" in which the SIGINT payload may be mechanically attached to any vehicle without any electrical connections (power or communication) to the vehicle. The SIGINT payload may then record data (SIGINT and/or Direction Finding) throughout the flight. The data may be sent to the GCS using its own communication circuit in real-time (e.g., as described above) or stored locally for post-processing after the flight (e.g., in data logger 786).

Adaptive control circuit 784 may be configured to combine SDR data and Vehicle data (flight data) into SIGINT data in the form of a payload message, which may be sent to GCS 678 via UAV communication circuit 672 and wireless communication channel 676.

Adaptive control circuit 784 is connected to a Data Logger 786, which can be enabled to record data (e.g., payload messages) for post-flight analysis. Data logging may be in addition to or instead of sending payload messages to GCS 678 (e.g., adaptive control circuit 784 may prioritize certain data to send in payload messages and may log more detailed data for later review, may log data while in an RF denied environment and later send data to GCS when RF communication is available or may otherwise combine logging and transmitting at different times). Adaptive control circuit 784 may communicate with UAV flight controller 211 via UAV interface 782 and communication channel 673. For example, adaptive control circuit 784 may generate flight control commands according to SDR Data and Vehicle data and may send flight control commands to UAV flight controller 211 to cause UAV 201 (and attached payload 450) to follow a desired flightpath (e.g., a flightpath that facilitates ongoing SIGINT operations).

Data from SIGINT payload 450 may be sent to GCS 678. A user may control UAV 201 and SIGINT payload 450 through GCS 678. A user may run SIGINT operations such as: Spectrum Sweep; Manual Direction Finding/Localization and/or Passive Recording (e.g., SIGINT payload 450 may collect data for post-flight analysis).

Figure 8:
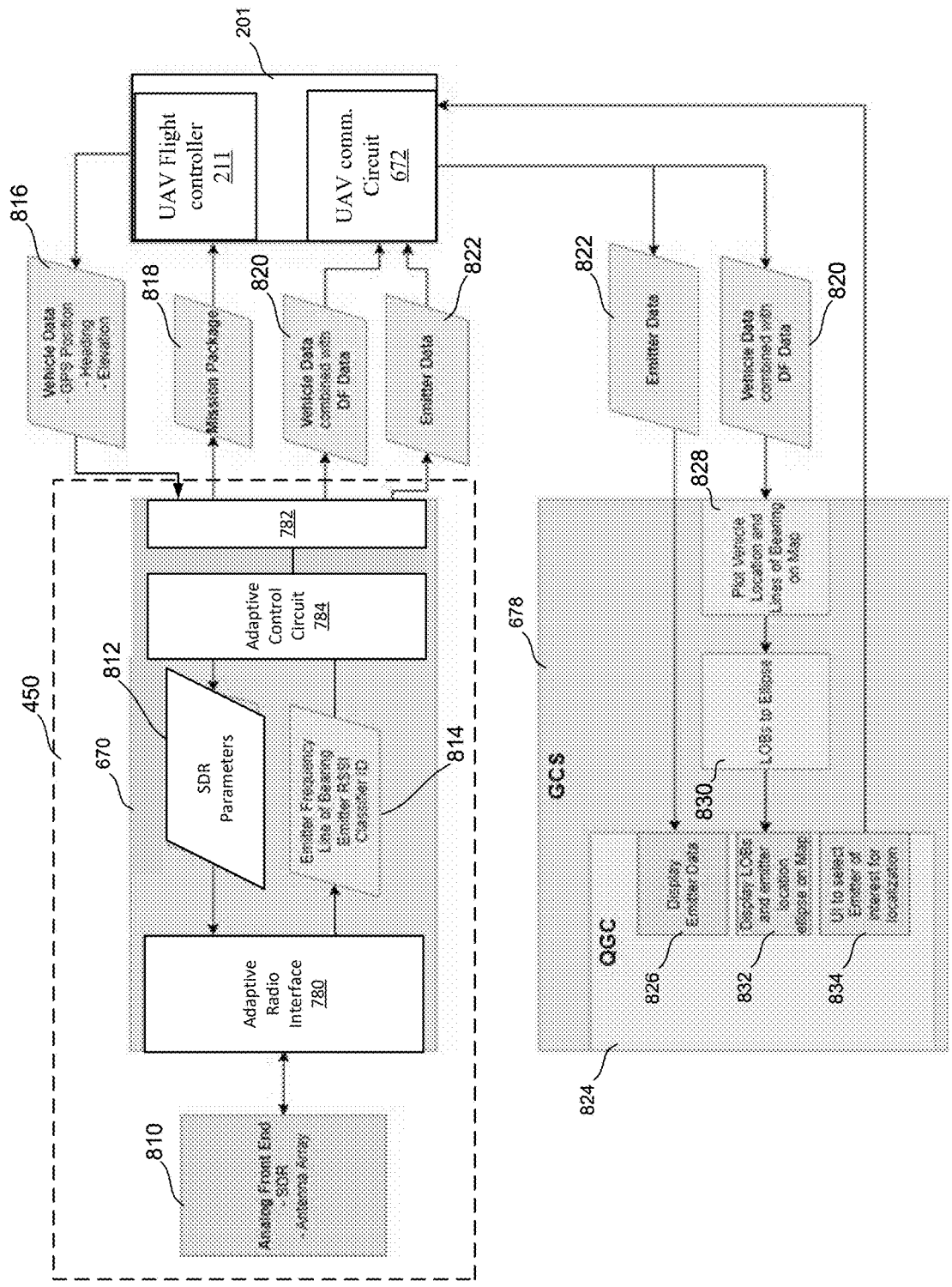
FIG. 8 shows an example of operation of a SIGINT payload in communication with a Ground Control Station (GCS).

FIG. 7B illustrates an example of a payload message that may be send by SIGINT payload 450 to GCS 678 (and/or may be stored in data logger 786 for post-flight analysis). This example payload message includes eight fields including a time stamp, four flight data fields and three SDR fields. The time stamp indicates when data contained in message was recorded (Data collection between flight controller and Radio Software (e.g., software of adaptive radio interface 780) needs to be time synced). The four flight data fields include longitude, latitude, heading and altitude of the UAV as generated by the flight controller. The three SDR fields include frequency, RSSI and LOB of a target emitter as indicated by radio software (SDR). While FIG. 7B provides an example of specific fields that may be included in a payload message, a wide variety of payload message fields may be used and a payload message may be configured with different fields according to requirements (e.g., adding or removing fields as needed). Additional examples of Payload Message Data Fields may include: Emitter Tag (User or Front End Radio Software can create labels to tag and differentiate different types of emitters), Emitter Modulation Type, Emitter Frequency Range, Emitter Frequency Lower Edge, Emitter Frequency Upper Edge, Emitter Signal to Noise Ratio (SNR), Classification Confidence (a representation of the confidence of the detection+classification of the signal), LOB Accuracy (estimated accuracy in degrees of generated LOB), or any other data received by SDR via the Adaptive Radio Interface FIG. 8 illustrates an example that shows aspects of the present technology. FIG. 8 shows SIGINT payload 450 including analog front end 810, which includes one or more SDR and one or more antenna array (e.g., one or more of SDR 1-N and one or more of Antenna Array 1-N of FIG. 6) connected to Adaptive SIGINT circuit 670. Adaptive SIGINT circuit includes adaptive SDR interface 780 ("adaptive radio interface"), which is in communication with adaptive control circuit 784. Adaptive SDR interface 780 may include signal processing circuits (e.g., circuits configured by appropriate software) for receiving and analyzing data collected by the SDR. For example, adaptive SDR interface 780 may generate LOBs and/or run signal classification on data received by the SDR. For example, adaptive radio interface 780 receives SDR parameters 812 indicating Frequency/signal of interest from adaptive control circuit 784 and sends SDR data 814, including, for example, emitter frequency, line of bearing (LOB), emitter RSSI and/or classifier ID to adaptive control circuit 784. In some cases, an SDR may have parameters (e.g., frequency and gain) that may be configurable by adaptive SDR interface 780, which may determine appropriate settings for such parameters (e.g., from parameters 812) and send them to the SDR. Analog front end 810 may include a wide range of SDRs that communicate using various SDR protocols to send data that may be processed using various SDR analysis tools (e.g., OmniSIG, GNURadio, KrakenSDR (e.g., open-source KrakenSDR)). An SDR may be a physically separate component with appropriate connectors to allow connection/disconnection to allow different SDRs to be connected at different times. Corresponding SDR analysis tools (e.g., OmniSIG, GNURadio, KrakenSDR) may be provided in adaptive SDR interface 780 to perform analysis and generate outputs of interest (e.g., LOBs). Adaptive radio interface 780 may convert SDR data from a range of SDR protocols (e.g., two or more different SDR protocols used by SDR analysis tools) to a common protocol (common SDR data format) used for communication with adaptive control circuit 784 (e.g., SDR data 814 may be generated by translation from an SDR protocol to a common protocol) to allow compatibility with a wide range of SDRs, SDR analysis tools and antenna arrays. Adaptive control circuit 784 receives vehicle data 816 (e.g., GPS position, heading and/or elevation and/or other UAV flight data) from UAV flight controller 211 of UAV 210 via UAV interface 782 and sends mission package 818 to flight controller 211. Adaptive control circuit 784 sends vehicle data (UAV flight data) combined with SDR data (e.g., Direction Finding (DF) data) 820 and emitter data 822 to UAV communication circuit 672, which sends them to GCS 678.

In GCS 678, emitter data is used by a user interface, QGC 824, to display emitter data to a user 826. Vehicle data combined with SDR data (DF data) 820 is used to plot vehicle (UAV) location and lines of bearing (LOBs) on a map 828 and combine LOBs to obtain an ellipse containing the target emitter 830, which is displayed on the map 832. The QGC user interface of GCS 678 may also be used to select an emitter of interest (target emitter) for localization 834. The target of interest is communicated via UAV communication circuit 672 to adaptive control circuit 784, which generates SDR parameters 812 accordingly.

Figure 9:
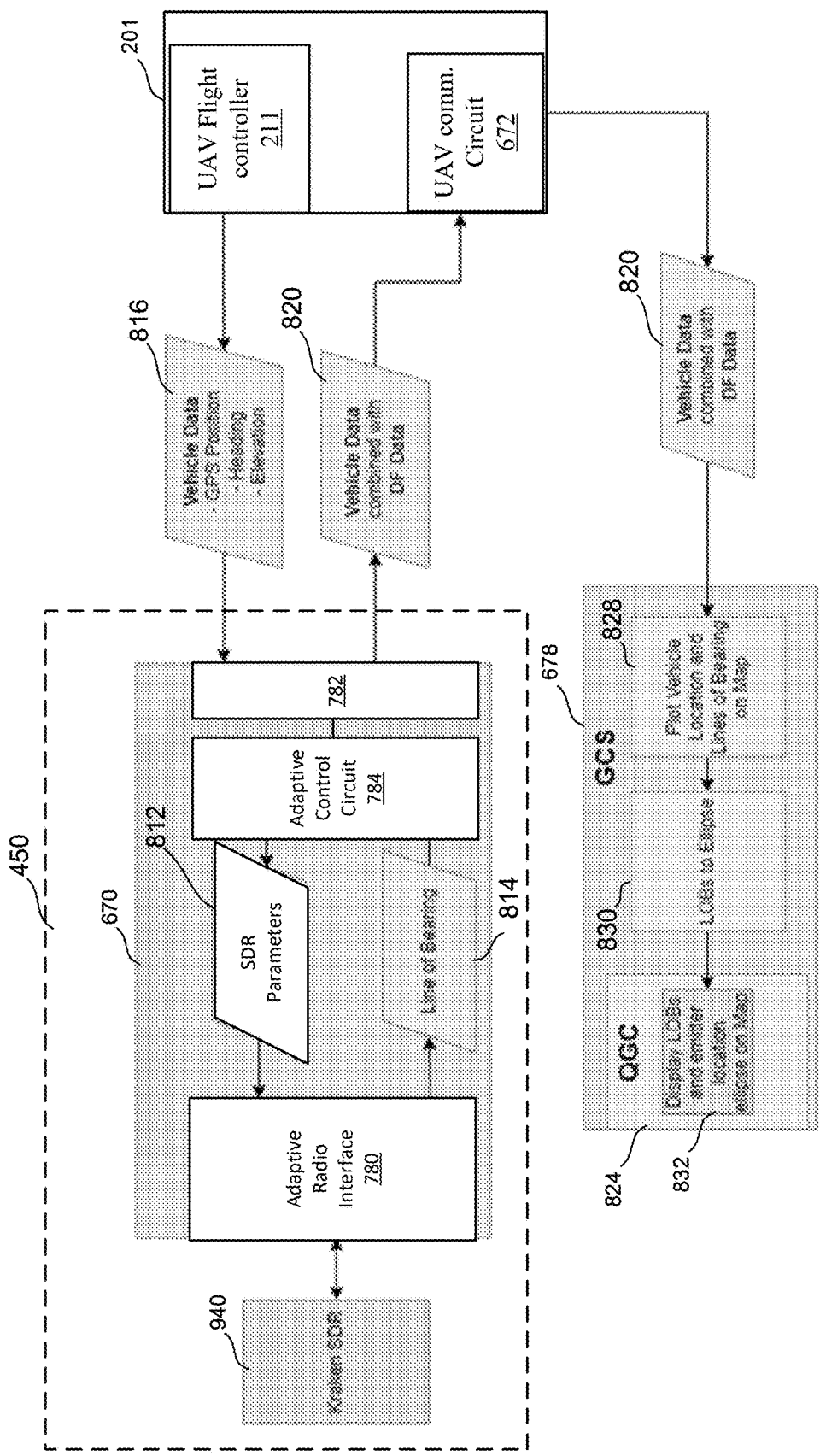
FIG. 9 shows an example of operation of a SIGINT payload in communication with a Ground Control Station (GCS).

FIG. 9 illustrates an example that shows aspects of the present technology. FIG. 9 shows SIGINT payload 450 including a Kraken SDR 940. Adaptive SIGINT circuit 670 includes adaptive radio interface 780, which is in communication with adaptive control circuit 784. For example, adaptive radio interface 780 receives SDR parameters 812 indicating Emitter frequency to localize from adaptive control circuit 784 and sends SDR data 814, including line of bearing (LOB) to adaptive control circuit 784. Adaptive radio interface 780 may convert SDR data from Kraken SDR protocol to a common SDR data protocol used for communication with adaptive control circuit 784 and/or for use in adaptive radio interface 780. For example, Kraken SDR signal processing software may receive data from the Kraken SDR according to the Kraken SDR protocol and may provide output (e.g., LOBs) according to the Kraken SDR protocol, which may then be converted to a common SDR protocol and sent to adaptive control circuit 784. Adaptive control circuit 784 receives vehicle data 816 (e.g., GPS position, heading and/or elevation and/or other flight data) from UAV flight controller 211 of UAV 210 via UAV interface 782 and sends vehicle data (flight data) combined with SDR data (e.g., Direction Finding (DF) data) 820 to UAV communication circuit 672, which sends them to GCS 678.

In GCS 678, vehicle data combined with SDR data (DF data) 820 is used to plot vehicle (UAV) location and lines of bearing (LOBs) on a map 828 and combine LOBs to obtain an ellipse containing the target emitter 830, which is displayed on the map 832.

Figure 10A:
FIGS. 10A-B show an examples of emitter localization using Lines Of Bearing (LOBs) from a UAV.
Figure 10B:
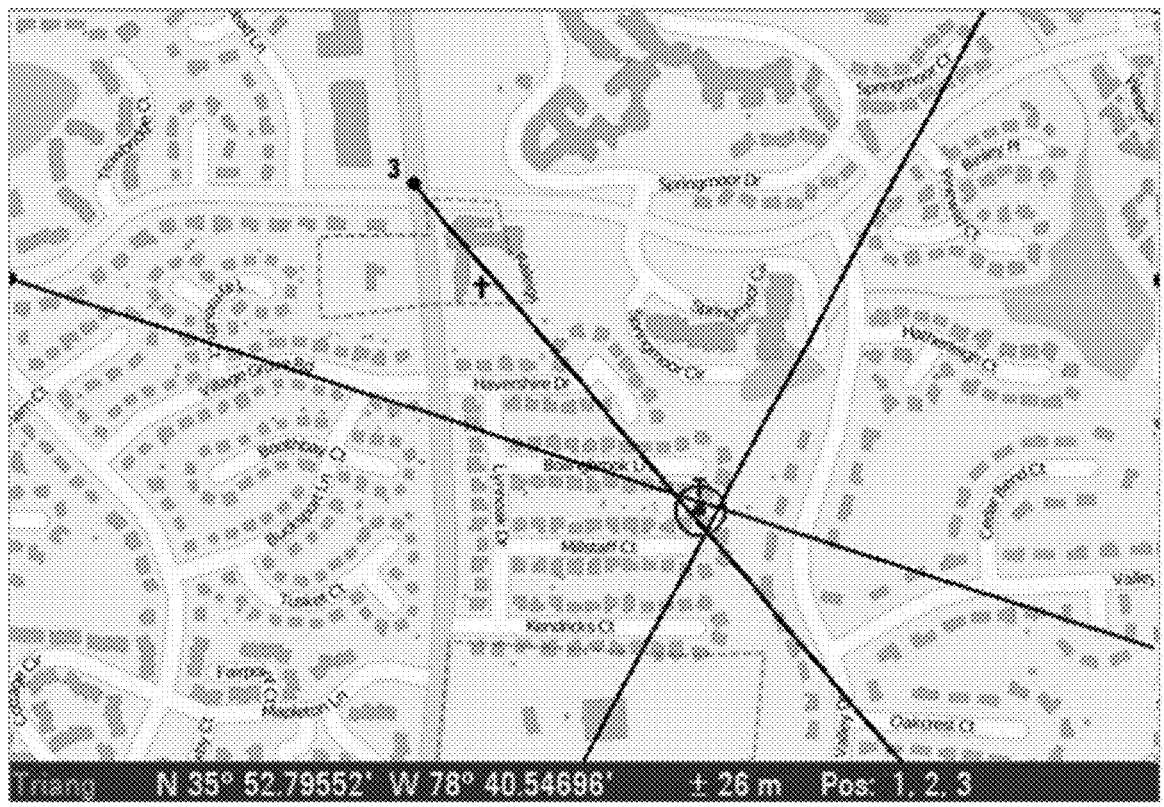

FIGS. 10A-B show examples of LOBs shown on a display (e.g., by GCS 678). FIG. 10A shows four LOBs that have a relatively small angular range. FIG. 10B shows three LOBs that have a large angular range, which may give a more accurate emitter location than the acute angles of FIG. 10A. In general, LOBs obtained closer to the target emitter and over a large angular range may provide more accurate emitter location.

Examples of operations that may be carried out by a UAV equipped with a SIGINT payload include a spectrum sweep and direction finding (e.g., for emitter localization). In an example of a spectrum sweep, signal data is collected by the SIGINT payload and sent to a GCS for analysis and/or recorded for subsequent post-flight analysis. In an example of direction finding, a SDR generates LOBs that are used to establish the location of an emitter.

Figure 11:
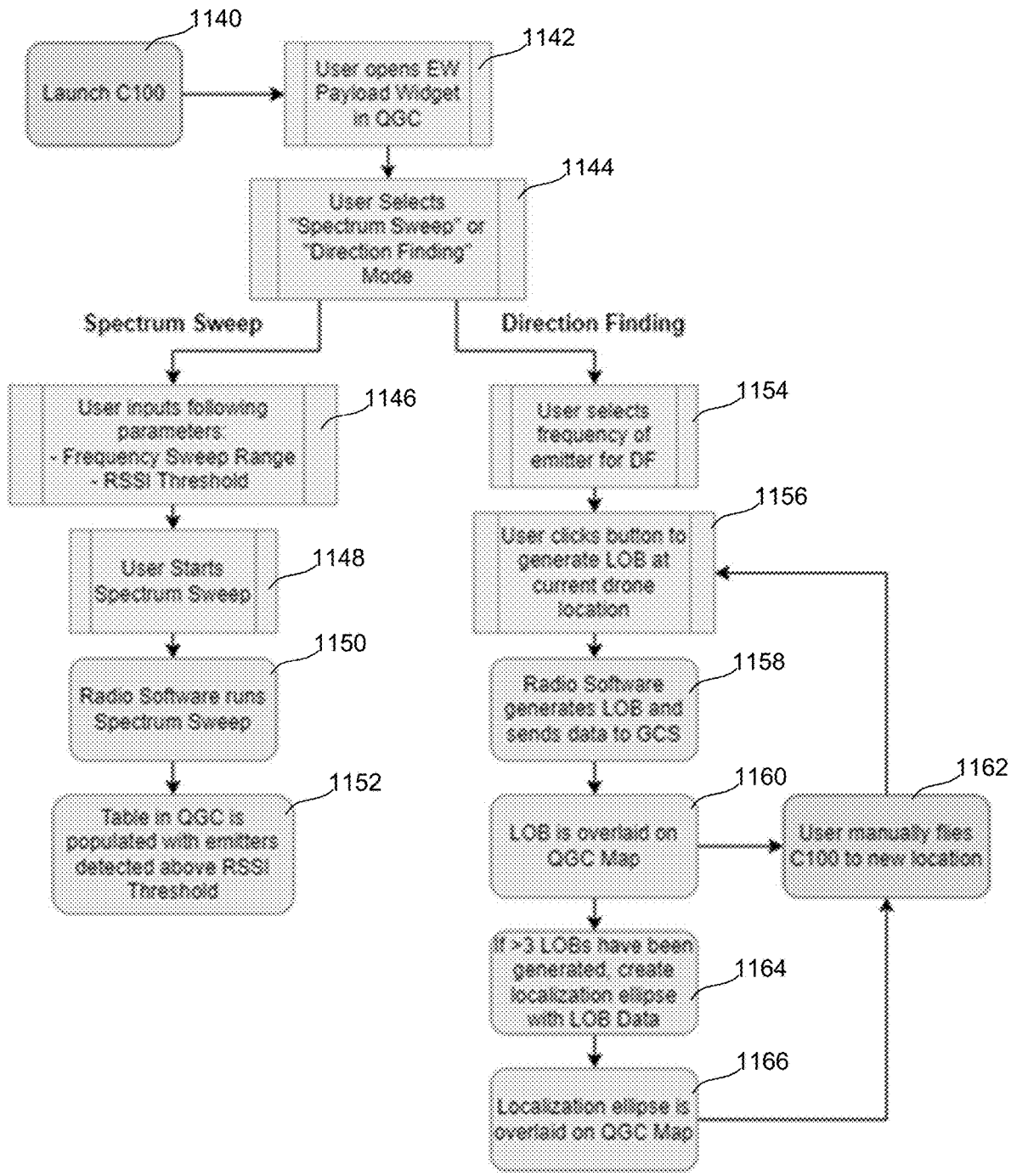
FIG. 11 shows an example of operations of a SIGINT payload in communication with a Ground Control Station (GCS).

FIG. 11 illustrates a method of operating a UAV equipped with a SIGINT payload (e.g., UAV 201 with SIGINT payload 450). The method includes launching a UAV (a C100 drone in this example) 1140, a user opening an Electronic Warfare (EW) payload widget in the GCS user interface (QGC) 1142 and selecting either "spectrum sweep" or "direction finding" mode 1144. While FIG. 11 shows spectrum sweep and direction finding as alternatives, they are not mutually exclusive and, in some cases, multiple missions may be combined so that a single mission may perform spectrum sweep and direction finding functions (e.g., using two SDRs, one with an omnidirectional antenna for spectrum sweep and one with a directional antenna for direction finding).

In a spectrum sweep operation, a user inputs parameters that may include a frequency sweep range, RSSI (Received Signal Strength Indicator) threshold 1146 and starts the spectrum sweep 1148. The radio software of the SDR runs the spectrum sweep 1150 and a table in the user interface (QGC) of the GCS is populated with emitters detected above the RSSI threshold 1152.

In a direction finding (DF) operation, a user selects a frequency of an emitter for DF 1154 and clicks a button to generate a LOB at a current drone location 1156. Radio software of an SDR generates the LOB and the adaptive control circuit sends it to the GCS 1158 where the LOB is overlaid on the QGC map 1160. The user may then manually fly the C100 drone to a new location 1162 (e.g., a location chosen to provide a second LOB that intersects the first LOB at a suitable angle). The user clicks a button to generate a LOB at the new (current) drone location 1156. Radio software of an SDR generates the second LOB and the adaptive control circuit sends it to the GCS 1158 where the second LOB is overlaid on the QGC map 1160 with the first LOB. A third LOB (and, if desired, additional LOBs) may be similarly obtained. At least two LOBs are needed to establish the location of an emitter (at the intersection of the LOBs) with more LOBs generally providing more accuracy. In the present example, more than three LOBs are used. If more than three LOBs have been generated, the QGC creates a localization ellipse with the LOB data 1164 and the localization ellipse is overlaid on the QGC map 1166.

In some cases, an operator may direct a UAV in response to data from a SIGINT payload to facilitate a mission. For example, in response to receiving a signal of interest and obtaining some location data regarding the emitter (e.g., an LOB), an operator may direct the UAV to a location to obtain more information regarding the signal/emitter (e.g., step 1164 in the example of FIG. 11). In another example, a UAV may be directed to a location that is closer to the emitter, to facilitate data collection in a spectrum sweep (e.g., gathering signal data from a closer location to reduce attenuation and/or interference and increase signal to noise ratio). In another example, a UAV with a SIGINT payload that performs spectrum sweep may detect an emitter of interest and may gather signals from the emitter. The UAV may be directed to remain in the area where the signal is received to facilitate gathering the signal from the emitter of interest.

While the examples of FIGS. 8-11 show SIGINT data being sent to a GCS for analysis with the UAV directed by a user of the GCS, in other examples, some or all of the actions performed by a user in the above examples may be performed by an adaptive control circuit (e.g., adaptive control circuit 784) in a SIGINT payload. An adaptive control circuit may generate and send flight control commands to a UAV flight controller based on SIGINT data received by the adaptive control circuit. For example, in response to data relating to emitter location (e.g., emitter relative location from an LOB combined with SIGINT payload location from a flight controller), an adaptive control circuit in the SIGINT payload may select a location for a subsequent LOB to obtain an accurate emitter location and may generate one or more flight control commands to cause the UAV to fly to the second location. In response to SIGINT data relating to emitter location (e.g., partial location data), an adaptive control circuit in the SIGINT payload may generate one or more flight control commands to fly the UAV to a location closer to the emitter (e.g., to facilitate obtaining a more accurate emitter location and/or facilitate gathering signal data from the emitter). Having the SIGINT payload directing the UAV flightpath may facilitate operation of in certain environments where connection between a UAV and a GCS is problematic. For example, certain environments may be "RF denied" because of radio jamming, interference, geography, or otherwise. In such environments, a SIGINT mission may proceed with the UAV directed by the SIGINT payload without external direction (e.g., without RF communication with a GCS) while still adapting to the SIGINT data that is received (e.g., modifying UAV flightpath in response to signals of interest). Such autonomous operation may enable adaptive SIGINT data gathering in challenging environments.

Figure 12:
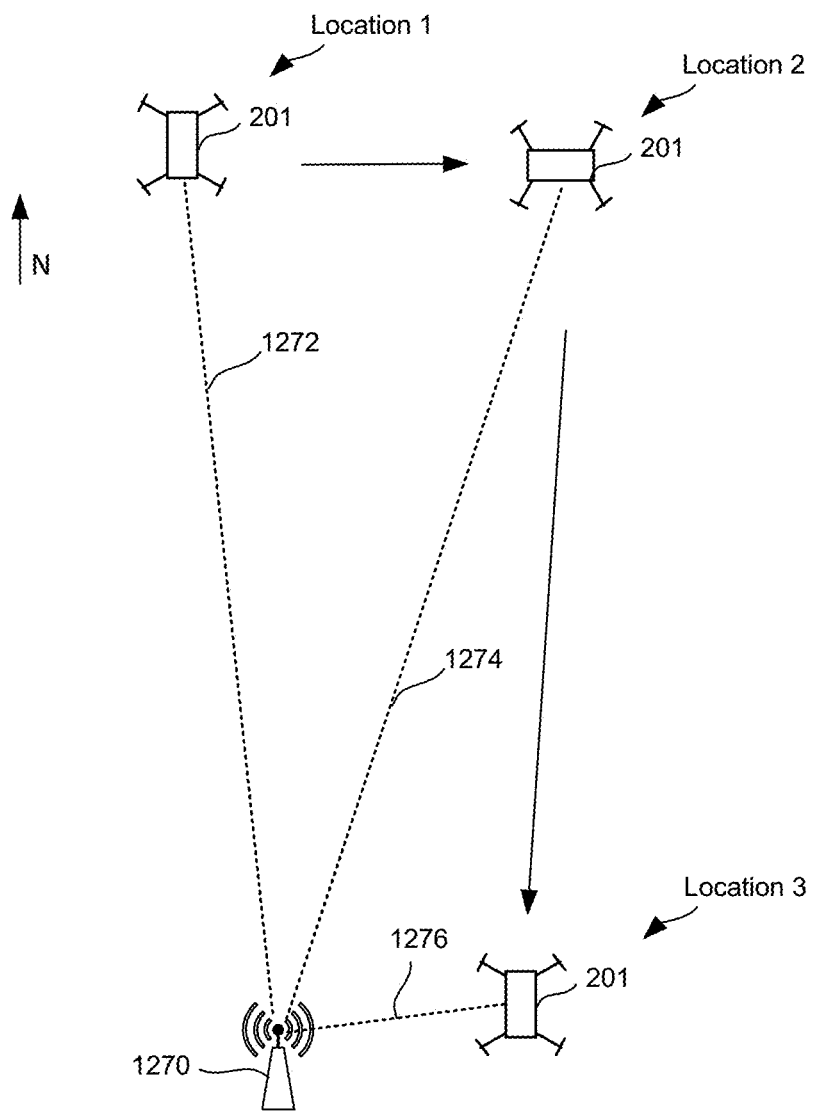
FIG. 12 shows an example of autonomous operation of a SIGINT payload for emitter localization using LOBs.

FIG. 12 shows an example of a UAV 201 directed by a SIGINT payload (e.g., SIGINT payload 450) attached to UAV 201 to perform an emitter localization by obtaining multiple LOBs. At a first time, a signal is received from an emitter 1270 and a first LOB 1272 is obtained (e.g., by an SDR). UAV 201 is at a first location (Location 1) flying north, away from emitter 1270 at this time. Adaptive control circuit 784 receives data including LOB 1272 from the SDR and receives flight data from UAV flight controller 211 including location (location 1) and heading (north) data. Adaptive control circuit 784 identifies a second location (Location 2) as a destination likely to provide a second LOB that would provide high location accuracy. For example, continuing north would provide a second LOB with a similar angle to the first LOB and would increase distance to the emitter which would risk losing the signal. A location to the east provides an LOB with a different angle while maintaining about the same distance and is selected by adaptive control circuit 784. Adaptive control circuit 784 generates flight control commands to cause UAV 201 to fly to location 2 (e.g., to change course from north to east).

Second LOB 1274 is obtained at location 2 and provides an approximate location for emitter 1270. Adaptive control circuit 784 receives data including second LOB 1274 from the SDR and receives flight data from UAV flight controller 211 including location (location 2) and heading (east) data. Adaptive control circuit 784 identifies a third location (Location 3) as a destination likely to provide a third LOB that would provide high location accuracy. For example, location 3 is closer to emitter 1270 and third LOB 1276 intersects first LOB 1272 at 90 degrees. Adaptive control circuit 784 generates flight control commands to cause UAV 201 to fly to location 3 (e.g., to change course from east to south) where third LOB 1276 is obtained. Additional LOBs may be similarly obtained (e.g., flying closer to emitter 1270).

While the example of FIG. 12 shows three discrete LOBs, in some cases, LOBs may be obtained continuously or frequently (e.g., on a near-continuous basis) and a UAV flightpath may be updated accordingly. While a single emitter is targeted in the example of FIG. 12, in other examples, LOBs may be obtained to multiple emitters and an adaptive control circuit may control UAV flightpath based on such LOBs (e.g., to allow accurate location data to be obtained for two or more emitters in parallel). While FIG. 12 shows emitter localization aspects of a mission, such aspects may be combined with other aspects including signal COMINT and or ELINT aspects (e.g., voice and/or text signals from emitter 1270 may be intercepted and/or information regarding emitter 1270 and its signal may be gathered and/or classified by SIGINT payload 450 of UAV 201 during the operations illustrated in FIG. 12).

Figure 13:
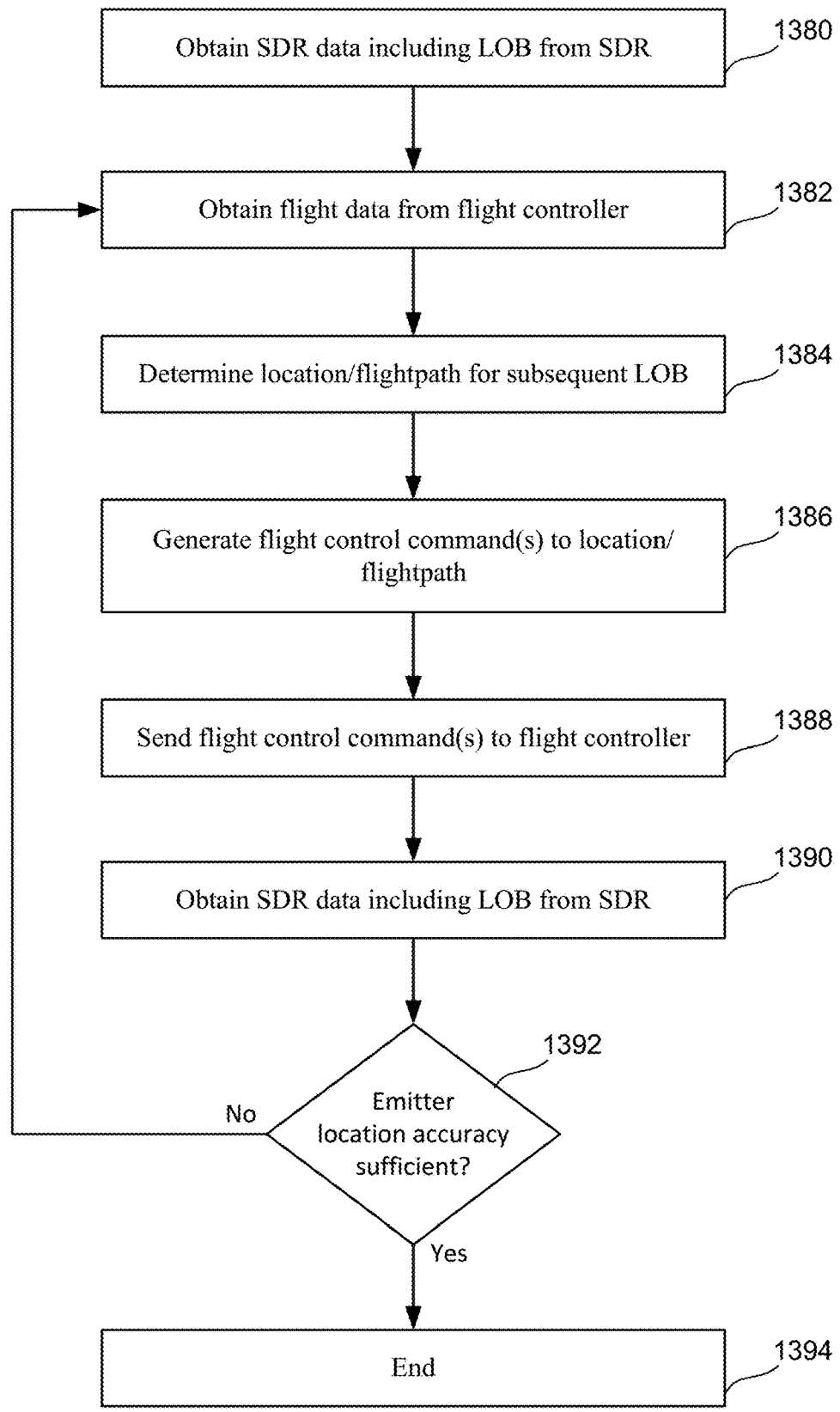
FIG. 13 shows a flowchart illustrating an example of autonomous operation of a SIGINT payload for emitter localization using LOBs.

FIG. 13 illustrates a method of autonomously performing emitter localization (e.g., by adaptive control circuit in 784 SIGINT payload 450 of UAV 201 as illustrated in FIG. 12). The method includes an adaptive control circuit obtaining SDR data including an LOB (e.g., LOB 1272) from an SDR 1380 and obtaining flight data from a flight controller 1382. The adaptive control circuit determines a location and/or flightpath for subsequent LOB(s) 1384, generates flight control command(s) to the location/flightpath 1386 and sends the flight control command(s) to the flight controller 1388. Subsequently, at the selected location or along the selected flightpath, the adaptive control circuit obtains SDR data including an LOB (e.g., LOB 1274) from the SDR 1390. The adaptive control circuit may combine the LOBs to estimate the emitter location and the accuracy of the emitter location and may determine if the emitter location accuracy is sufficient 1392 (e.g., accuracy within 100 meters, 50 meters, 10 meters, 5 meters, 1 meter, or other such threshold). If the emitter location accuracy is sufficient then the emitter localization operation may end 1394 and the UAV may return to a base or may perform additional operations (e.g., to localize additional emitters, gather signals, or other such SIGINT operations). If the emitter location accuracy is not sufficient then the adaptive control circuit may obtain flight data from the flight controller 1382 at the current location and determine an additional location/flightpath for a subsequent LOB 1384, which provides additional accuracy. Additional LOBs may be obtained in this way until sufficient emitter location accuracy is achieved.

Figure 14:
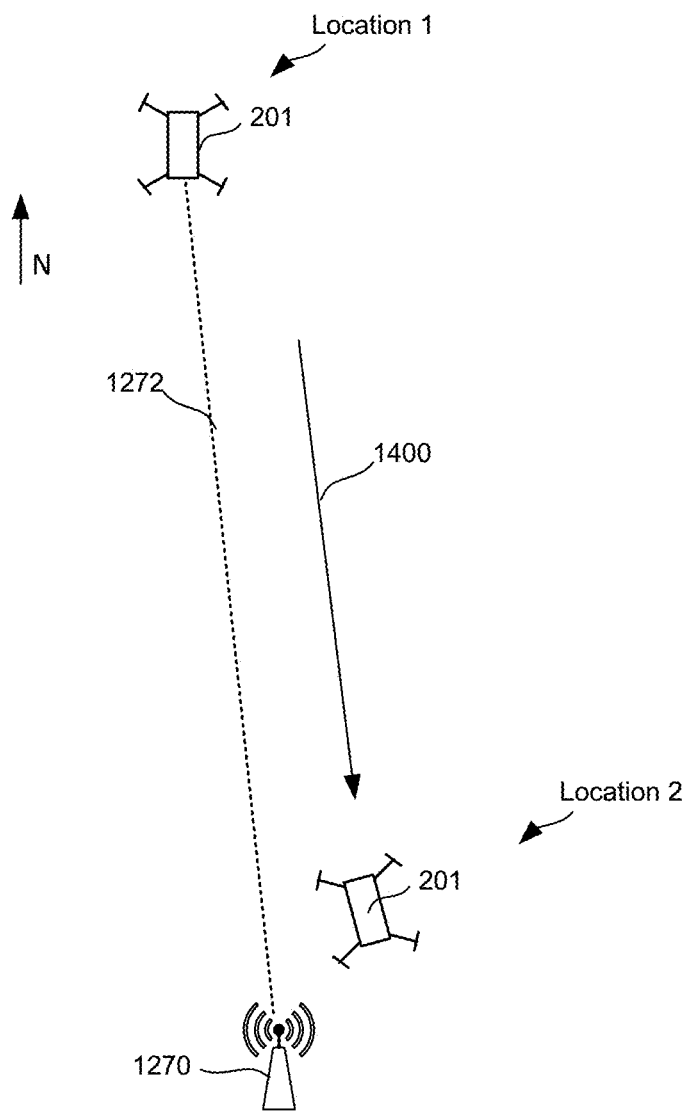
FIG. 14 shows an example of autonomous operation of a SIGINT payload.

FIG. 14 shows another example of a UAV 201 directed by a SIGINT payload (e.g., SIGINT payload 450) attached to UAV 201 (not separately shown). At a first time, a signal is received from an emitter 1270 and a first LOB 1272 is obtained (e.g., by an SDR). UAV 201 is at a first location (Location 1) flying north, away from emitter 1270 at this time. Adaptive control circuit 784 receives data including LOB 1272 from the SDR and receives flight data from UAV flight controller 211 including location (location 1) and heading (north) data. Adaptive control circuit 784 identifies a flightpath 1400 as likely to bring UAV 201 closer to emitter 1270. For example, flightpath 1400 may coincide with or be parallel to LOB 1272. Subsequently, when UAV 201 is in close proximity to emitter 1270 at location 2, adaptive control circuit 784 may determine that location 2 is a suitable location for gathering SIGINT (e.g., collecting COMINT, such as voice or text and/or ELINT). Adaptive control circuit 784 may generate flight control command(s) to cause UAV 201 to remain at or near location 2 (e.g., hovering or circling) for a period of time to gather SIGINT. In some cases, an adaptive control circuit may generate commands to activate additional components at location 2, for example, cameras to obtain visual data regarding emitter 1270 and any related assets. While the example of FIG. 14 shows LOB 1272, other emitter localization data from an SDR may be sufficient to enable a UAV to be directed towards an emitter (e.g., increasing/decreasing signal strength).

Figure 15:
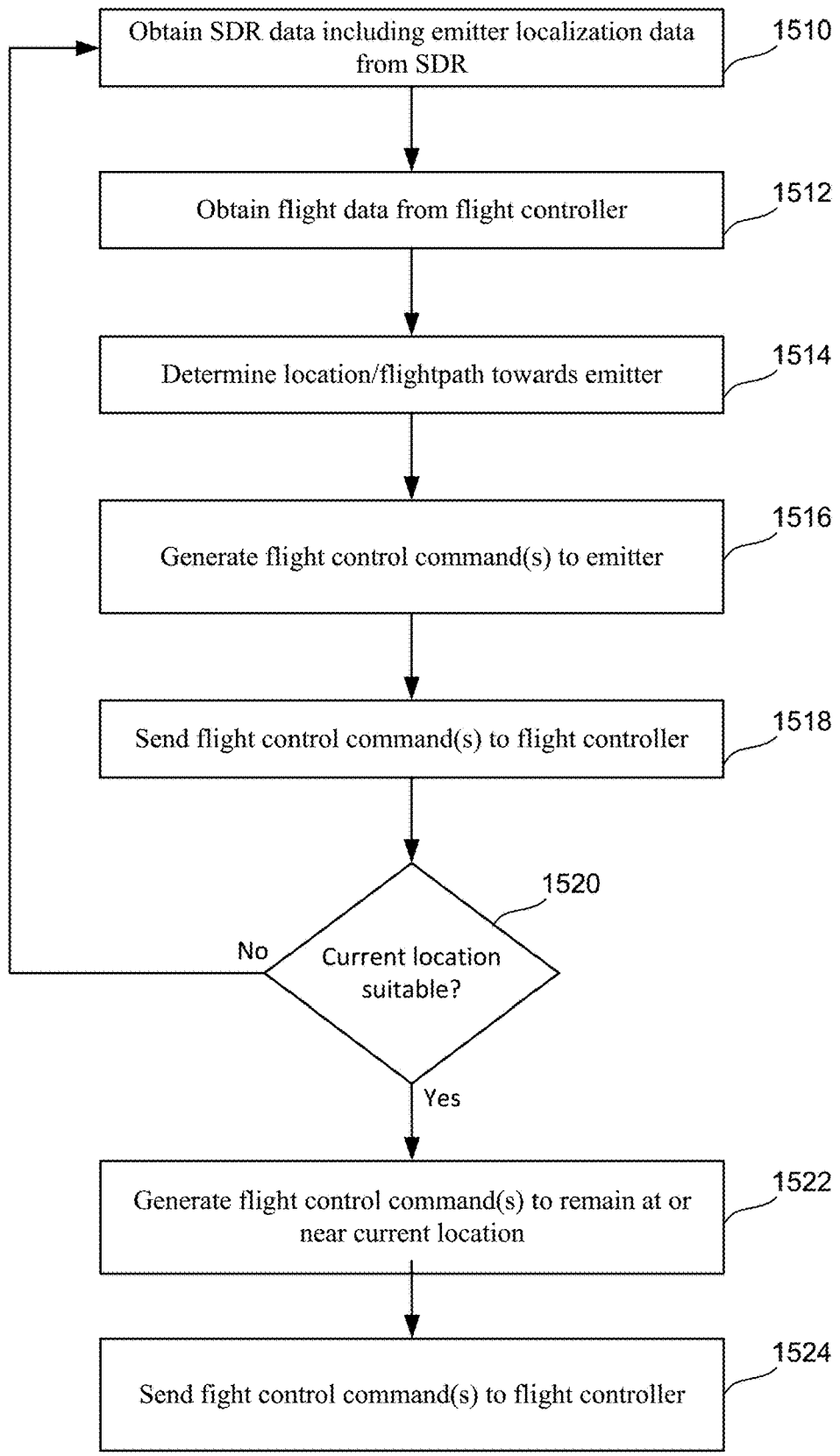
FIG. 15 shows a flowchart illustrating an example of autonomous operation of a SIGINT payload.

FIG. 15 illustrates a method of autonomously operating a UAV with a SIGINT payload (e.g., by adaptive control circuit in 784 SIGINT payload 450 of UAV 201 as illustrated in FIG. 14) to cause the UAV to move towards a target emitter (e.g., emitter of interest as determined by signal type or otherwise). The method includes an adaptive control circuit obtaining SDR data including emitter localization data (e.g., signal strength data, signal direction data, or other data) from an SDR 1510 and obtaining flight data (e.g., location and heading) from a flight controller 1512. The adaptive control circuit determines a location and/or flightpath towards the emitter 1514, generates flight control command(s) to the emitter 1516 and sends the flight control command(s) to the flight controller 1518. Subsequently, a determination is made as to whether the current location is suitable 1520 (e.g., sufficient signal strength to make location suitable for SIGINT collection operations). If the current location is not suitable then additional SDR data and flight data to determine a new location or flightpath towards the emitter. In this way, the UAV may move through a series of locations until a suitable location is found. When a suitable location is found, the adaptive control circuit generates flight control command(s) to remain at or near the current location 1522 (e.g., hovering, circling, landing or otherwise remaining within a limited area) and sends the flight control command(s) to the flight controller 1524.

While FIGS. 12-15 provide specific examples of the present technology in autonomous SIGINT missions, the present technology is not limited to such examples. In some cases, where RF communication is enabled, some or all of the operations of the adaptive control circuit of the SIGINT payload may be performed by, or supplemented by circuits located elsewhere (e.g., in a GCS). In some cases, a UAV with a SIGINT payload may not use any RF communication throughout a mission (e.g., may generate and follow a flightpath autonomously and may record SIGINT data locally in a SIGINT payload), while in other cases communication may be continuously or periodically established to allow remote control and/or sending of data.

Figure 16:
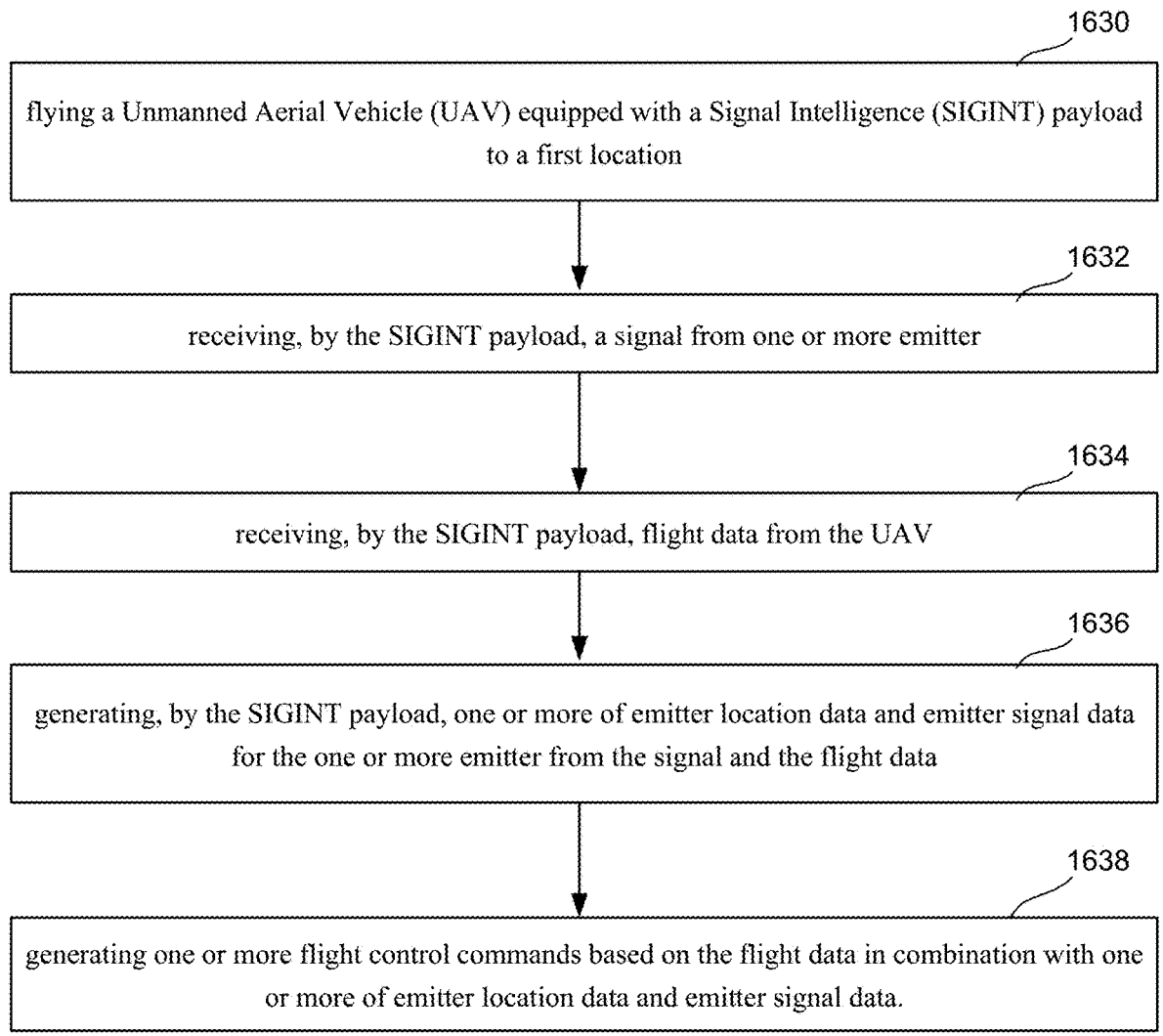
FIG. 16 illustrates an example of a method of operating a UAV with a SIGINT payload.

FIG. 16 shows a method of autonomously operating a UAV with a SIGINT payload (e.g., by adaptive control circuit in 784 SIGINT payload 450 of UAV 201 as illustrated in FIG. 12). The method includes flying an Unmanned Aerial Vehicle (UAV) equipped with a Signal Intelligence (SIGINT) payload to a first location 1630 (e.g., location 1) receiving, by the SIGINT payload, a signal from one or more emitter 1632 (e.g., from emitter 1270) and receiving, by the SIGINT payload, flight data from the UAV 1634. The method further includes generating, by the SIGINT payload, one or more of emitter location data and emitter signal data for the one or more emitter from the signal and the flight data 1636 and generating one or more flight control commands based on the flight data in combination with one or more of emitter location data and emitter signal data 1638 (e.g., flight control commands to fly to a location to collect additional emitter localization data such as additional LOB(s) as illustrated in FIGS. 12-13 and/or a location closer to the emitter to collect COMINT and/or ELINT data as illustrated in FIGS. 14-15).

A SIGINT payload according to aspects of the present technology is highly adaptable and configurable. For example, adjustable voltage regulator 666 may provide power to various different SDRs at different voltages and adaptive radio interface 780 of adaptive SIGINT circuit 670 may communicate with different SDRs using different protocols so that SDRs may be swopped out as needed for different missions without requiring significant customization of the UAV or payload.

Figure 17:
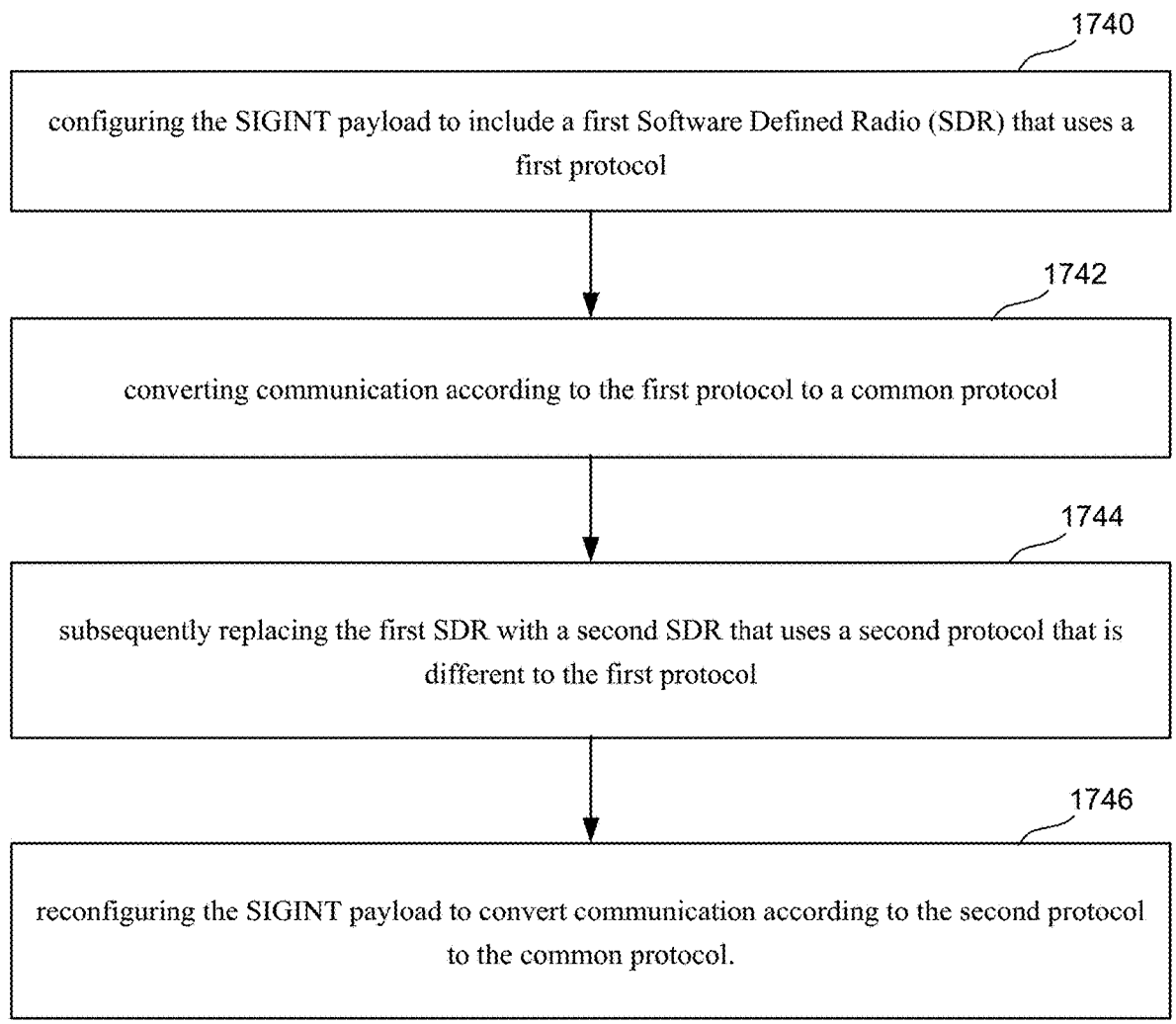
FIG. 17 illustrates an example of a method that includes reconfiguring a SIGINT payload.

FIG. 17 illustrates an example of a method that includes configuring the SIGINT payload to include a first Software Defined Radio (SDR) that uses a first protocol 1740 and converting communication according to the first protocol to a common protocol 1742. For example, the first protocol may be any one of OmniSIG, GNURadio or KrakenSDR or other SDR protocol used by an SDR and/or SDR signal processing software (adaptive radio interface 780 may be configured to convert communication to a common protocol for communication with adaptive control circuit 784). The method further includes subsequently replacing the first SDR with a second SDR that uses a second protocol that is different to the first protocol 1744 (e.g., a different one of OmniSIG, GNURadio or KrakenSDR or other SDR protocol) and reconfiguring the SIGINT payload to convert communication according to the second protocol to the common protocol 1746. For example, adaptive radio interface 780 may be reconfigured to convert communication according to the second protocol instead of the first protocol and may be updated to operate appropriate SDR signal processing software corresponding to the second SDR. In this way, different SDRs with different characteristics may be used at different times to achieve different objectives. In some examples, an adaptive SDR interface may be configured to carry out a detection or hand-shake routine when connected to an SDR to determine the characteristics of the SDR (e.g., what SDR protocol the SDR uses and what power supply voltage it requires). The adaptive SDR interface may then use the appropriate SDR protocol (e.g., may access a corresponding set of parameters in configuration library 781 and use the parameters to configure interface operation) and may cause an adjustable voltage regulator (e.g., adjustable voltage regulator 666) to be configured to provide the appropriate voltage. In this way, changing SDRs may be a "plug-and-play" operation with reconfiguration occurring with little or no user input required.

An example of an Unmanned Aerial Vehicle (UAV) payload includes an adaptive Software Defined Radio (SDR) interface that is configurable to communicate with two or more SDRs using two or more protocols, each SDR configured to receive signals from one or more emitter; a UAV interface that is configured to communicate with the UAV; and a control circuit connected to the adaptive SDR interface and to the UAV interface, the control circuit configured to communicate with the adaptive SDR interface and with the UAV interface, the control circuit configured to receive SDR data from the adaptive SDR interface, receive UAV flight data from the UAV interface and use the SDR data and the UAV flight data to generate Signal Intelligence (SIGINT) data regarding the one or more emitter.

The SIGINT data may include signal classification data that identifies a type of Radio Frequency (RF) signal emitted by an emitter of the one or more emitters. The SIGINT data may include emitter location data that identifies a location of an emitter of the one or more emitters. The emitter location data may be obtained using angle of arrival at two or more locations to generate two or more Lines Of Bearing (LOBs). The control circuit may be further configured to generate flight control commands according to the SIGINT data and send the flight control commands to a flight controller of the UAV to control UAV flightpath. The control circuit may be further configured to, in response to obtaining a first Line of Bearing (LOB) to an emitter when the UAV is at a first location, generate a flight control command to change the UAV flightpath to fly the UAV to a second location that is located to provide a second LOB to the emitter, the second LOB selected to provide high location accuracy in combination with the first LOB. The control circuit may be further configured to generate a flight control command to change the UAV flightpath to fly the UAV closer to the location of the emitter. The adaptive SDR interface may be configurable to communicate with two or more SDR protocols that include two or more of: OmniSIG, GNURadio and KrakenSDR. The adaptive SDR interface may be configured to convert communication using the two or more protocols to a common SDR data format for generation of the SIGINT data and the control circuit may be configured to send the SIGINT data to the UAV for transmission to a Ground Control Station (GCS) or store the SIGINT data in the UAV payload without transmitting the SIGINT data.

An example method includes flying a Unmanned Aerial Vehicle (UAV) equipped with a Signal Intelligence (SIGINT) payload to a first location; receiving, by the SIGINT payload, a signal from one or more emitter; receiving, by the SIGINT payload, flight data from the UAV; generating, by the SIGINT payload, one or more of emitter location data and emitter signal data for the one or more emitter from the signal and the flight data; and generating one or more flight control commands based on the flight data in combination with one or more of emitter location data and emitter signal data.

The method may further include configuring the SIGINT payload to include a first Software Defined Radio (SDR) that uses a first protocol; converting communication according to the first protocol to a common protocol; subsequently replacing the first SDR with a second SDR that uses a second protocol that is different to the first protocol; and reconfiguring the SIGINT payload to convert communication according to the second protocol to the common protocol. The first protocol may be a first one of OmniSIG, GNURadio or KrakenSDR and the second protocol may be a second one of OmniSIG, GNURadio or KrakenSDR. The method may further include recording the one or more of location data and signal data or sending the one or more of location data and signal data to a Ground Control Station (GCS). A flight control command may be generated based on flight data that includes UAV location in combination with a first Line Of Bearing (LOB) to a target emitter, the flight control command directing the UAV to a second location to obtain a second LOB to the emitter. A first flight control command may be generated to cause the UAV to fly towards a target emitter. Subsequently, at least a second flight control command may be generated to maintain the UAV in proximity to the target emitter to enable collection of a signal from the target emitter.

An example of a system includes an Unmanned Aerial Vehicle (UAV); a UAV Signal Intelligence (SIGINT) payload attached to the UAV, the UAV SIGINT payload including: one or more Software Defined Radios (SDRs) configured to receive signals from one or more emitter; an adaptive SDR interface connected to the one or more SDRs, the adaptive SDR is configurable to communicate using two or more different SDR protocols; a UAV interface that is configured to communicate with the UAV; and a control circuit connected to the adaptive SDR interface and to the UAV interface, the control circuit configured to communicate with the adaptive SDR interface and with the UAV interface, the control circuit configured to receive emitter relative location data from the one or more SDRs through the adaptive SDR interface, receive UAV flight data from the UAV through the UAV interface and combine the emitter relative location data and the UAV flight data to generate emitter location data.

The control circuit may be further configured to select a destination based on the emitter relative location data and the UAV flight data, generate flight control commands based on the destination and send the flight control commands through the UAV interface to a flight controller of the UAV to cause the UAV to fly to the destination. The system may further include a Ground Control Station (GCS); and a transmitter in the UAV, the transmitter configured to receive the emitter location data from the control circuit through the UAV interface and transmit the emitter location data to the GCS.

For purposes of this document, it should be noted that while various examples are given with specific combinations of components and specific configurations, in general, components used in one example may also be used in other examples and configurations may be combined.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. An Unmanned Aerial Vehicle (UAV) payload comprising:
   an adaptive Software Defined Radio (SDR) interface that is configurable to communicate with two or more SDRs using two or more protocols, each SDR configured to receive signals from one or more emitter;
   a UAV interface that is configured to communicate with the UAV; and
   a control circuit connected to the adaptive SDR interface and to the UAV interface, the control circuit configured to communicate with the adaptive SDR interface and with the UAV interface, the control circuit configured to receive SDR data from the adaptive SDR interface, receive UAV flight data from the UAV interface and use the SDR data and the UAV flight data to generate Signal Intelligence (SIGINT) data regarding the one or more emitter.

2. The UAV payload of claim 1 wherein the SIGINT data includes signal classification data that identifies a type of Radio Frequency (RF) signal emitted by an emitter of the one or more emitter.

3. The UAV payload of claim 1 wherein the SIGINT data includes emitter location data that identifies a location of an emitter of the one or more emitter.

4. The UAV payload of claim 3 wherein the location of the emitter is obtained using one or more of angle of arrival, time difference of arrival, frequency difference of arrival and power of arrival.

5. The UAV payload of claim 4 wherein the emitter location data is obtained using angle of arrival at two or more locations to generate two or more Lines Of Bearing (LOBs).

6. The UAV payload of claim 3 wherein the control circuit is further configured to generate flight control commands according to the SIGINT data and send the flight control commands to a flight controller of the UAV to control UAV flightpath.

7. The UAV payload of claim 6, wherein the control circuit is further configured to, in response to obtaining a first Line of Bearing (LOB) to an emitter when the UAV is at a first location, generate a flight control command to change the UAV flightpath to fly the UAV to a second location that is located to provide a second LOB to the emitter, the second LOB selected to provide high location accuracy in combination with the first LOB.

8. The UAV payload of claim 6, wherein the control circuit is further configured to generate a flight control command to change the UAV flightpath to fly the UAV closer to the location of the emitter.

9. The UAV payload of claim 1, wherein the adaptive SDR interface is configurable to communicate with two or more SDR protocols that include two or more of: OmniSIG, GNURadio and KrakenSDR.

10. The UAV payload of claim 1, wherein the adaptive SDR interface is configured to convert communication using the two or more protocols to a common SDR data format for generation of the SIGINT data and the control circuit is configured to send the SIGINT data to the UAV for transmission to a Ground Control Station (GCS) or store the SIGINT data in the UAV payload without transmitting the SIGINT data.

11. A method, comprising:
flying an Unmanned Aerial Vehicle (UAV) equipped with a Signal Intelligence (SIGINT) payload to a first location;
receiving, by the SIGINT payload, a signal from one or more emitter;
receiving, by the SIGINT payload, flight data from the UAV;
generating, by the SIGINT payload, one or more of emitter location data and emitter signal data for the one or more emitter from the signal and the flight data; and
generating one or more flight control commands based on the flight data in combination with one or more of emitter location data and emitter signal data.

12. The method of claim 11, further comprising:
configuring the SIGINT payload to include a first Software Defined Radio (SDR) that uses a first protocol;
converting communication according to the first protocol to a common protocol;
subsequently replacing the first SDR with a second SDR that uses a second protocol that is different to the first protocol; and
reconfiguring the SIGINT payload to convert communication according to the second protocol to the common protocol.

13. The method of claim 12, wherein the first protocol is a first one of OmniSIG, GNURadio or KrakenSDR and the second protocol is a second one of OmniSIG, GNURadio or KrakenSDR.

14. The method of claim 11, further comprising recording the one or more of location data and signal data or sending the one or more of location data and signal data to a Ground Control Station (GCS).

15. The method of claim 11, wherein a flight control command is generated based on flight data that includes UAV location in combination with a first Line Of Bearing (LOB) to a target emitter, the flight control command directing the UAV to a second location to obtain a second LOB to the emitter.

16. The method of claim 11, wherein a first flight control command is generated to cause the UAV to fly towards a target emitter.

17. The method of claim 16, wherein subsequently, at least a second flight control command is generated to maintain the UAV in proximity to the target emitter to enable collection of a signal from the target emitter.

18. A system comprising:
an Unmanned Aerial Vehicle (UAV);
a UAV Signal Intelligence (SIGINT) payload attached to the UAV, the UAV SIGINT payload including:
one or more Software Defined Radios (SDRs) configured to receive signals from one or more emitter;
an adaptive SDR interface connected to the one or more SDRs, the adaptive SDR is configurable to communicate using two or more different SDR protocols;
a UAV interface that is configured to communicate with the UAV; and
a control circuit connected to the adaptive SDR interface and to the UAV interface, the control circuit configured to communicate with the adaptive SDR interface and with the UAV interface, the control circuit configured to receive emitter relative location data from the one or more SDRs through the adaptive SDR interface, receive UAV flight data from the UAV through the UAV interface and combine the emitter relative location data and the UAV flight data to generate emitter location data.

19. The system of claim 18, wherein the control circuit is further configured to select a destination based on the emitter relative location data and the UAV flight data, generate flight control commands based on the destination and send the flight control commands through the UAV interface to a flight controller of the UAV to cause the UAV to fly to the destination.

20. The system of claim 18, further comprising:
a Ground Control Station (GCS); and
a transmitter in the UAV, the transmitter configured to receive the emitter location data from the control circuit through the UAV interface and transmit the emitter location data to the GCS.

* * * * *